(12) United States Patent
Bannach

(10) Patent No.: US 7,720,827 B2
(45) Date of Patent: May 18, 2010

(54) NETWORK META-DATA LIBRARIES AND RELATED METHODS

(75) Inventor: Matthias Bannach, Setauket, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1190 days.

(21) Appl. No.: 10/923,797

(22) Filed: Aug. 24, 2004

(65) Prior Publication Data
US 2006/0047618 A1    Mar. 2, 2006

(51) Int. Cl.
*G06F 7/00* (2006.01)
*G06F 17/00* (2006.01)
*G06F 17/30* (2006.01)
*G06F 12/00* (2006.01)

(52) U.S. Cl. ........................ 707/695; 707/756; 707/827

(58) Field of Classification Search ......... 707/100–102, 707/203, 1, 6, 104.1, 200
See application file for complete search history.

(56) References Cited

U.S. PATENT DOCUMENTS

| | | | |
|---|---|---|---|
| 5,579,384 A * | 11/1996 | Seymour | 379/243 |
| 6,247,017 B1 * | 6/2001 | Martin | 707/102 |
| 6,614,781 B1 * | 9/2003 | Elliott et al. | 370/352 |
| 6,839,724 B2 * | 1/2005 | Manchanda et al. | 707/203 |
| 7,289,435 B2 * | 10/2007 | Yehuda et al. | 370/222 |
| 7,545,788 B2 * | 6/2009 | Anschutz et al. | 370/340 |
| 2002/0032769 A1 * | 3/2002 | Barkai et al. | 709/224 |
| 2004/0022237 A1 * | 2/2004 | Elliott et al. | 370/356 |
| 2006/0041658 A1 * | 2/2006 | Nelson et al. | 709/224 |
| 2006/0212460 A1 * | 9/2006 | Boggs | 707/100 |

\* cited by examiner

*Primary Examiner*—Wilson Lee
*Assistant Examiner*—Merilyn P Nguyen
(74) *Attorney, Agent, or Firm*—Capitol Patent & Trademark Law Firm, PLLC

(57) ABSTRACT

Network meta-data libraries act as repositories of evolving management information models (MIM) and management information based (MIB) models. Changes to the models may be originated using the libraries or tracked by the libraries. In addition, the libraries may be used to generate and store transformation models used by mediation units to transform changes made to network elements, such as routers, into normalized meta-data that can be understood by an operations support system.

28 Claims, 2 Drawing Sheets

NETWORK META-DATA LIBRARIES AND RELATED METHODS

BACKGROUND OF THE INVENTION

Co-pending patent application Ser. No. 10/923,867, incorporated herein as if set forth in full herein, discusses, among other things, methods and devices for reducing the cost of updating an operations support system (OSS) by using a mediation unit. The mediation units discussed in co-pending U.S. patent application Ser. No. 10/923,867, among other things, transform or convert (collectively referred to as "transform") so-called meta-data from one or more network elements (NEs), into one or more forms of normalized, meta-data which can be recognized by one or more OSSs (e.g., Performance OSS, Provisioning OSS, Assurance OSS, Fault OSS, Accounting OSS, Security OSS, etc., to name just a few). One of the advantages provided by the mediation units discussed in co-pending U.S. patent application Ser. No. 10/923,867 is that only a single mediation unit is required to transform changes made by any number of NEs into normalized meta-data which may be recognized by an OSS. The use of such a mediation unit greatly reduces the cost of updating an OSS each time there is a change to any number of different NEs.

Because each NE may be made by a different vendor, each NE's meta-data may be based on a different management information model (MIM) or management information based (MIB) model. To carry out transformations, the mediation unit must, therefore, generate, receive or have access to, a number of different models. The mediation unit must have access to transformation models which are used to transform vendor-specific meta-data or related definitions associated with a particular NE and network management system models (synonymously referred herein as normalized models) associated with a particular OSS, such as those OSSs disclosed in co-pending U.S. patent application Ser. No. 10/923,798, incorporated herein as if set forth in full herein.

Though it may generate these models itself, it is more desirable to have the mediation unit receive these models from another component (e.g., program, device, etc.).

Another challenge presented by the use of mediation units disclosed in U.S. patent application Ser. Nos. 10/923,798 and 10/923,867 is tracking changes made to models as new versions of these models are implemented. It is also desirable to analyze the differences between one version of a model and a subsequent or preceding version in order to identify similarities, inconsistencies or areas which require fixes to be made by software engineers or the like (collectively referred to herein as "version control").

Besides version control (sometimes referred to as "life cycle management"), it is also desirable to generate new or modified network element models in a cost-effective manner.

It is desirable, therefore, to provide devices and related methods that can carry out version control and be used to develop new network element models in a cost-effective manner.

SUMMARY OF THE INVENTION

We have recognized that model version control and model development may be provided by a network meta-data library that is capable of both receiving changes to models associated with network elements or OSSs, and generating new models for such elements/systems. In one form of version control, the meta-data library may compare received changes associated with one or more models to one or more stored models, and then identify those portions of the stored models affected by the received changes. The meta-data library may then generate an audit trail for the one or more stored models consisting of the affected portions and any edits or updates to the affected portions as a way of meeting version control requirements.

The meta-data libraries provided by the present invention also enable the development of new models by, for example, using common meta-meta data definitions to generate new models. These definitions act as an underlying "grammar" shared by the meta-data library, network elements, OSSs and mediation units.

DETAILED DESCRIPTION OF THE INVENTION

Figure 1:
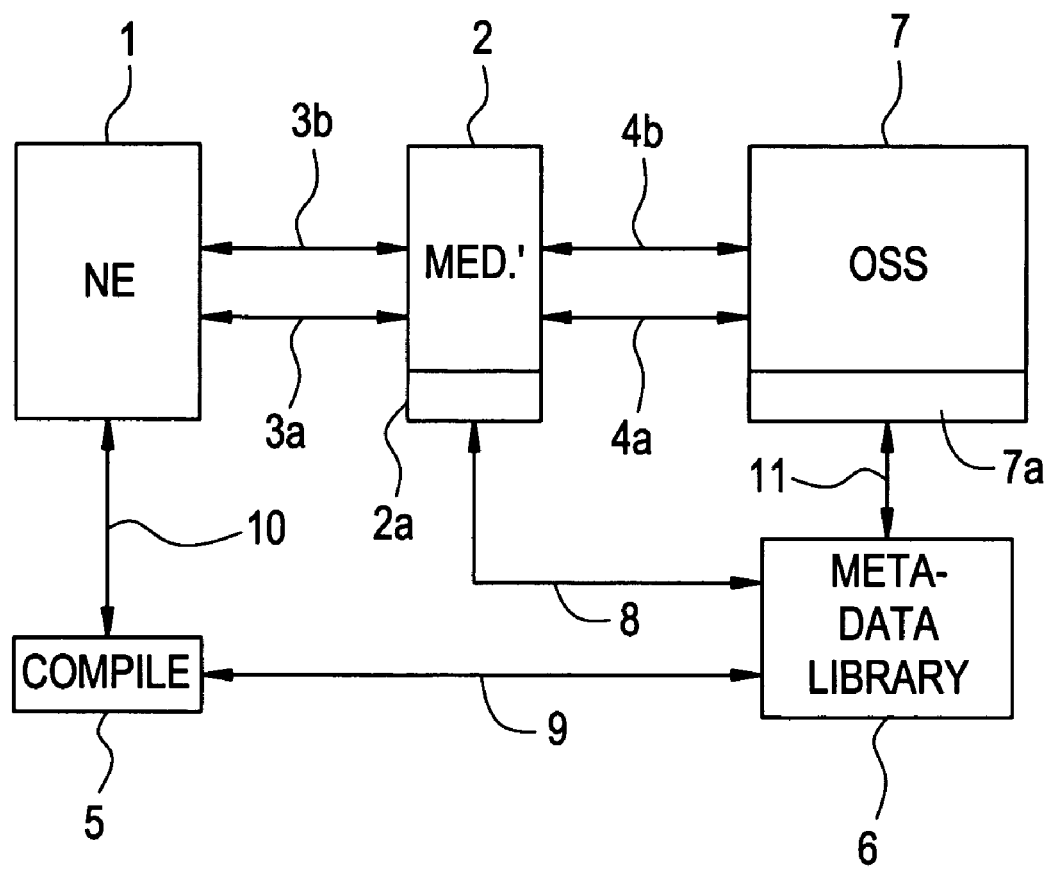
FIG. 1 depicts a simplified block diagram showing a network meta-data library according to one embodiment of the present invention.

Referring now to FIG. 1, there is shown a network meta-data library 6 according to one embodiment of the present invention. As shown, the meta-data library 6 is connected to a mediation unit 2, a compiler 5 and OSS 7. When changes are made to the NE 1, it is desirable to update the OSS 7. This requires transformation of models used by the network element NE 1 into a type of meta-data referred to as normalized meta-data, which can be understood by the OSS 7. These transformations are beyond the scope of the present invention and are discussed in more detail in co-pending U.S. patent application Ser. Nos. 10/923,798 and 10/923,867, referred to above. In general, the transformations are carried out by the mediation unit 2 with the help of a number of models which are typically stored in the meta-data library 6. Each time the model used by NE 1 is changed, for example, this change creates a new version of the model. Each version of this model must also be stored in order to create an audit trail of the various changes and versions of the model used by NE 1. In one embodiment of the present invention, meta-data library 6 is operable to carry out this version control.

At some point in time, a network operator may wish to make changes to the model used by NE 1 without interrupting the operation of the NE 1 and without incurring unnecessary or substantial costs. In a further embodiment of the present invention, the meta-data library 6 is operable to generate revisions to, or new versions of, the model used by NE 1 (i.e., associated meta-meta-data definitions, meta-data, etc.) which then can be sent to the NE 1.

In addition, in yet a further embodiment of the present invention, the meta-data library 6 is operable to analyze the different versions of NE models and transformation models used by the mediation unit 2, in order, for example, to ensure that OSS 7 is accurately updated (e.g., receives normalized meta-data which accurately reflects changes to the network element model).

Having presented a general overview of a network meta-data library provided by the present invention, the following win discuss specific features of this meta-data library.

Figure 2:
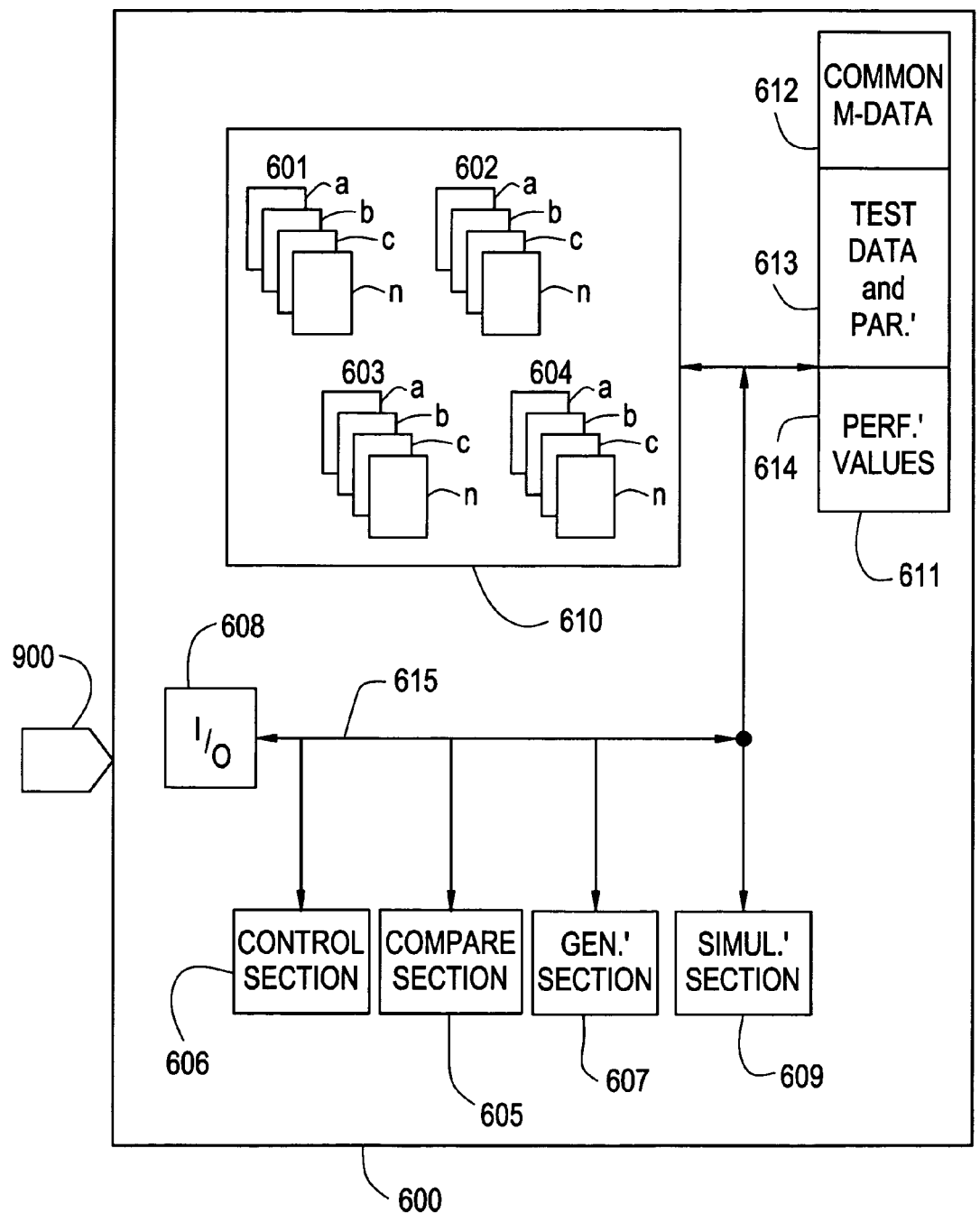
FIG. 2 depicts a simplified block diagram of sections of a network meta-data library according to another embodiment of the present invention.

Referring now to FIG. 2, there is shown a network meta-data library 600 according to yet another embodiment of the present invention. As shown, library 600 may comprise a model storage section 610, test and development data storage section 611, comparison section 605, control section 606, generation section 607, input-output section 608 and simulation section 609. It should be understood that although the various sections are shown as being separate, one or more of these sections may be combined to form fewer sections or, alternatively, one or more of these sections may be further broken down to form additional sections. It should also be understood that each of these sections may represent one or more programs, components of a program, either in software or firmware, or may represent one or more hardware components, such as various processors, memory sections and the like or some combination of the above.

As shown, model storage section 610 comprises a NE model storage subsection 601, transformation model storage subsection 602, OSS model storage subsection 603 and meta-meta data storage subsection 604. Test and development data storage section 611 is shown comprising a common meta-meta-data definition storage subsection 612, a test data/parameter storage subsection 613, and a performance value storage subsection 614. Again, similar to the meta-data library 600, the model storage section 610 and its associated subsections and the test and development data storage section 611 and its various subsections may be combined into fewer sections or subsections or further broken down into additional sections or subsections. Likewise, each of these sections may be implemented in software, firmware or hardware or some combination of the above. In the case of software or firmware, each of these sections may be implemented in one or more programs or program components.

If meta-data library 600 is realized in hardware, then the various sections may be connected by pathways 615. If these sections are combined in software/firmware, the pathways 615 merely indicate that these sections are inter-related to one another.

The meta-data library 600 shown in FIG. 2 may be used to carry out the features and functions of the present invention. In one embodiment of the present invention, the meta-data library 600 is operable to receive, via wired or wireless pathway 900 at the beginning of a processing time, additions, deletions, changes (e.g., to meta-meta-data definitions, meta-data, etc. collectively referred to as "changes") associated with one or more NE models. In general, any signal received via pathway 900 related to a model is processed by library 6. On receiving the changes, the library 600 is operable to compare the received changes to one or more models stored in subsections 601-604 using, for example, the comparison section 605. Once these comparisons are completed, the meta-data library 600 is further operable to identify those portions of the compared, stored models that are affected by the received changes. Backtracking somewhat, as is also shown in FIG. 2, each of the model storage subsections 601-604 may comprise a plurality of stored models. For example, the NE model storage subsection 601 may comprise a plurality of stored, NE models 601a, 601b, 601c, ... 601n (where "n" is the last model). Each of the stored models 601a, 601b, 601c, ... 601n may represent a different version of a model used by one NE or may represent different versions used by different NEs. In the latter case, it should be understood that although NE 1 shown in FIG. 1 is shown as a single network element, NE 1 may represent a plurality of network elements (similarly, OSS 7 in FIG. 1 may comprise one or more OSSs). For example, the NE model storage subsection 601 may comprise a stored model for each version of a model used by each network element. Similarly, transformation model storage subsection 602 may comprise a plurality of stored, transformation models which may represent different versions of the same model used to transform changes made to network element models into normalized meta-data, etc. and/or may represent different transformation models altogether while OSS model storage subsection 603 and meta-meta data model storage subsection 604 may each be operable to store a plurality of OSS models/versions or meta-meta data models/versions, respectively.

It should be understood that in this embodiment of the present invention, the versions/models stored in the respective subsections represent previously generated versions or models.

Generally, once the meta-data library 600 has identified a portion of one or more of the stored models that are affected by the received changes, the meta-data library 600 is operable to generate a new version of each stored model which is so affected. That is, the meta-data library 600 is operable to update one or more models contained in one or more of the model storage subsections 601-604 to ensure that at any point in time the library 600 contains the most recent changes. In one embodiment of the present invention, the received changes originate from one or more NEs 1 though changes may be received from OSS 7, too. In this manner, at any point in time meta-data library 600 contains a copy of the changes made to the model being used by one or more of the NEs 1/OSSs 7 as well as a copy of the new model which incorporates those changes being used by one or more NEs 1/OSSs 7.

Not only is the meta-data library 600 capable of generating new versions of each stored model affected by the received changes, it is also operable to store the received changes (e.g., meta-meta-data definitions, meta-data, etc.) and those portions which were identified as being affected by the received changes. Because of this, the meta-data library 600 is also operable to generate an audit trail of changes to one or more NEs 1, OSSs 7, etc., as well as an audit trail of the one or more models stored within stored subsections 601-604 consisting, for example, of the affected portions and any suggested edits or updates carried out.

Once the meta-data library 600 has generated new versions of each stored model which were affected by received changes, the meta-data library 600 may be further operable to forward one or more of these versions to the mediation unit 2 shown in FIG. 1 to enable the mediation unit 2 to generate one or more forms of normalized meta-meta-data definitions, meta-data, etc., recognizable by one or more of the OSSs 7.

Because the time period between the reception of the changes by the meta-data library 600 and the generation of the normalized meta-data may be relatively short, it may be said that the generation of the normalized meta-data comes in response to the reception of the received changes.

When new versions of a model are generated, it is important to ensure that each new version is consistent with one another. For example, it may occur that a number of stored models within storage subsections 601-604 are affected by received changes, requiring the generation of a new version for each of the affected models. It is important to ensure that when each of these new versions is generated that they be generated in a consistent manner. Failure to do so may render the generated versions unreliable as a model evolves over time.

To help ensure that each new generated version of a model remains consistent with one another, the present invention provides for network meta-data libraries that are operable to store one or more common meta-meta-data definitions or meta-data which can be used to interpret one or more stored models. Referring to FIG. 2, there is shown a common meta-meta-data definition storage subsection 612 within test and development data storage section 611. In one embodiment of the present invention, each new version of a model generated by the meta-data library 600 is based on the use of these common meta-meta-data definitions. For example, each time a new version is created, the meta-data library 600 is operable to first retrieve a previous version of a stored model which is to be updated from subsections 601-604. The meta-data library 600 then interprets this model using the common meta-meta-data definitions and meta-data stored in subsection 612 to identify those sections of the previous version which are affected, for example, by newly received changes. Once the affected portions are identified, these portions may then be updated, in effect by generating a new version of the one or more stored models, also using the common meta-meta-data definitions.

Because each of the new versions are generated using common meta-meta-data definitions, there is a level of assurance that each of the new versions is substantially similar or consistent with one another.

It may occur that a software engineer or network operator wishes to make changes to one or more of the NEs 1 using the meta-data library 600. For example, if a number of NEs 1 need to be programmed with a new version of a model, it may be more efficient for a software engineer or network operator to make the changes using the meta-data library 600 than having to implement the changes using each one of the NEs 1. The common meta-meta-data definitions may be useful in this situation as well.

In a further embodiment of the present invention, meta-data library 600 may be further operable to edit one or more stored models within subsections 601-604 using at least one or more of the stored common meta-meta-data definitions from subsection 612, for example. These edits may also include the addition of one or more documentation comments to the stored models, the addition of constraint definitions (discussed more below) or other model information.

In yet a further embodiment of the present invention, the meta-data library 600 may also be operable to generate actual code (or other similar outputs) using the common meta-meta-data definitions and meta-data within subsection 612. The code which is generated by the meta-data library 600 may be used for one or more of the NEs 1, OSSs 7 and/or mediation unit 2.

As indicated above, and described in more detail in co-pending U.S. patent application Ser. Nos. 10/923,798 and 10/923,867 referred to above, the meta-data library 600 is used in conjunction with the mediation unit 2 to transform changes, e.g., meta-data or meta-meta-data definitions, etc. into normalized meta-data or meta-meta-data definitions that can be used by one or more OSSs 7 shown in FIG. 1. In one embodiment of the present invention, the meta-data library 600 may be used during this transformation process as follows.

Upon receipt of one or more changes to a model, the library 600 is operable to link portions of one or more models stored in subsections 601-604 to the received changes. That is, the meta-data library 600 may use common meta-meta-data definitions or meta-data to identify one or more portions of models stored within subsections 601-604 that are affected by the received changes. Once identified, these portions may then be said to be "linked" to the received changes. A generation section 607 or the like may make use of the identity of the affected portions to generate one or more maps of such portions. These portions may be stored within the generation section 607 or another section of the meta-data library 600. Meta-data library 600 may also use alternative means to identify those portions of stored models within subsections 601-604 that are affected by received changes other than by using common meta-data. In an alternative embodiment of the present invention, the meta-data library 600 is operable to identify portions affected by received changes on a meta-meta-data-definition-by-meta-meta-data-definition basis. Or, meta-data library 600 may be further operable to identify the portions affected by the received changes on a portion-by-portion basis. That is, linking may be achieved by identifying individual meta-meta-data definition within a model which is affected by the received changes or by identifying an entire portion which is affected by the received changes.

The received changes may originate at one or more of the NEs 1, OSSs 7, etc., or may be manually input by a software engineer, network operator or the like. Once the affected portions of one or more of the stored models within subsections 601-604 have been identified, the meta-data library 600 may be further operable to generate one or more transformation models using one or more of the generated maps. Generation section 607 or the like may be used for this purpose. Once the transformation models are generated, one or more may then be forwarded on to a mediation unit to enable the generation of one or more forms of normalized meta-data, etc., recognizable by one or more OSSs. Similar to what was stated before, because the generation of this normalized meta-data may follow within a relatively short time frame of the receipt of changes by meta-data library 600, it can be said that the generation of the normalized meta-data is in response to received changes.

Prior to forwarding the newly generated transformation models on to a mediation unit, the meta-data library 600 may be further operable to compare one or more of the newly generated models to a model associated with the received changes, for example, to a model associated with one or more NEs. This comparison is done to ensure that each of the newly generated models is substantially similar or consistent with one or more models that are associated with the received changes. Said another way, this is done to ensure that any changes made to an NE are accurately reflected in any model generated by the meta-data library 600.

If this comparison identifies part of a model (e.g., entire portions or individual meta-data) that is different from portions of models associated with the received changes (e.g., different from portions of a network element model), the meta-data library may be further operable to modify the identified parts to make them substantially similar to the portions of the models associated with the received changes. During the generation of the new transformation models or during the comparison and modification process, the meta-data library 600 may be further operable to generate one or more documentation comments associated with one or more of the modified parts in order to create an audit trail of modifications, etc.

During the discussion above, it was mentioned that meta-data library 600 may be used by a software engineer or network operator to make changes to an NE, OSS or mediation unit. Practically speaking, changing a model of an NE, etc., while an NE is in operation is difficult to do. Accordingly, the present invention provides for meta-data libraries 600 that are operable to simulate the operation of one or more models used by NEs, OSSs without connecting to the one or more NEs, OSSs to determine whether one or more proposed changes to these models can be implemented. For example, during non-peak hours, a software engineer or network operator may access meta-data library 600 using pathway 900 in order to forward proposed changes associated with one or more of the NEs. Upon receipt of these proposed changes, the meta-data library 600 may be operable to generate one or more new NE models associated with one or more of the NEs. This generation may occur within generation section 607 or the like. Thereafter, the meta-data library 600 may be operable to simulate the operation of one or more of the generated, network element models, within section 609 for example, to determine whether the one or more of the proposed changes can be implemented or not. If the simulations are successful, then the proposed changes may be implemented in the one or more NEs. If the simulations are unsuccessful, then, in all practicality, the proposed changes will not be able to be implemented within the NEs.

In yet a further embodiment of the present invention, the meta-data library 600 may further be operable to identify one or more constraint definitions based on the results of the simulations or editing. These constraint definitions are analogous to metes and bounds. They may be used to guide the software engineer or network operator as to what changes may, or may not, be implemented within one or more NEs, OSSs, etc.

Though these proposed changes may be entered into the meta-data library 600 directly by a software engineer or network operator, in yet another embodiment of the present invention the meta-data library 600 may receive these proposed changes from one or more OSSs.

Assuming the simulations result in a determination that the proposed changes are acceptable, the meta-data library 600 may yet be further operable to generate one or more transformation models based on the results of the one or more simulations. Thus, in addition to modifying the models associated with NEs, the meta-data library 600 may also take this opportunity to generate the transformation models which will be needed by a mediation unit to transform changes received from these new network element models into normalized meta-meta-data definitions, for example. These models may also be generated based on a combination of the simulation results and other requirements.

As was mentioned before, one of the difficulties faced by a network operator is that a given network which he or she is responsible for may contain a number of NEs made by different vendors. It is a substantial, if not extremely difficult, challenge to ensure that each vendor's NEs are recognizable by the OSSs which are a part of the same network. For example, each time a network operator decides to add a network element to his or her network, it is desirable to know beforehand the model used by the network element. In some cases, a vendor may grant a network operator the opportunity to test an NE prior to installation. In many cases, the responsibility for testing NEs falls on the manufacturer of the meta-data library or OSS and not on the network operator. In the latter case, the manufacturer of the OSS or meta-data library may be a competitor of the manufacturer or vendor of the NE. Reluctantly, a vendor of the NE may grant its competitor access to a "test" NE but only for a very short period of time and only on a limited basis. If such access is granted, the manufacturer of the OSS or meta-data library must make effective use of the limited time they will have access to the test NE. More specifically, when such access is granted, it is important to be able to obtain as much information as possible about the models used by the NE. The present invention provides meta-data libraries which allow this to occur.

Upon receiving access to a test NE, meta-data libraries of the present invention may be connected to such NEs using a compiler, such as compiler 5 shown in FIG. 1. To verify whether any of the stored models within meta-data library 600 are compatible with the model used by the NE, meta-data library 600 may be further operable to forward one or more test models to one or more test NEs. These test models may be stored within a subsection of the test and development data storage section 611, such as subsection 613, or may be alternatively stored within the model storage section 610, for example, in one of the subsections 601-604.

After forwarding the one or more test models to one or more test NEs, the meta-data library 600 may be further operable to monitor the operation of one or more models of the one or more test NEs via pathway 900 or the like. The meta-data library 600 may be operable to receive data or parameters (collectively "parameters") associated with the operation of the one or more models or test NEs via pathway 900 or the like. These parameters may be stored within the test and development data storage section 611, for example, within subsection 613. Thereafter, the meta-data library 600 may be operable to analyze these parameters to determine if the one or more test NEs were able to effectively use one or more of the forwarded test models. If the result of this analysis indicates that one or more of the forwarded test models can be used by the one or more test NEs, then these test models are stored within one or more of the storage subsections 601-604 for later use when a network operator installs a commercial version of one of the test NEs in his or her network. If, on the other hand, the parameters indicate that one or more of the forwarded test models cannot be used by one or more of the test NEs, then the meta-data library 600 may be further operable to generate one or more next versions of the one or more forwarded models based on the parameters. Each next version represents a model which, hopefully, can be implemented by one or more of the test NEs. This process may continue until the meta-data library 600 determines that one of the generated, next versions may be used by one or more of the test NEs. Each time the meta-data library 600 determines that a next version of a forwarded model can be used by a test NE, this version is stored within a subsection 601-604.

As indicated above, sometimes a software engineer or network operator wishes to be able to actually write code for one or more NEs. The meta-data libraries 600 provided by the present invention in conjunction with a compiler, such as compiler 5 shown in FIG. 1, may be used to generate such code and to forward the code to one or more NEs, such as NE 1, for example. It should be understood that meta-data library 600 can be used to generate code for other elements besides NEs.

In yet a further embodiment of the present invention, the meta-data library 600 may be operable to generate code associated with one or more of the stored models within subsections 601-604 and then forward this code to the compiler 5 which then compiles the code and sends it on to one or more NEs 1.

In addition to forwarding code on to a compiler, meta-data libraries provided by the present invention may also be operable to receive models from a compiler. For example, if a vendor of a particular NE does not allow access to a test network element or the like, the model(s) used by commercial versions of the vendor's NE must be determined in some other way order to effectively use the NE with an already installed library and/or OSS. In an embodiment of the present invention, meta-data libraries provided by the present invention are further operable to receive one or more compiled network element models from a compiler, such as compiler 5. Upon receiving these compiled network element models, meta-data libraries provided by the present invention may be further operable to interpret or otherwise process the received network element models in order to generate new, transformation models. The processed network element models can then be stored within subsection 601 while the new transformation models are stored within subsection 602. Thereafter, each of these models may be sent to a mediation unit, such as mediation unit 2, to allow the mediation unit 2 to transform changes from an NE 1 into normalized meta-data, etc. for use by one or more OSSs.

In yet additional embodiments of the present invention, the meta-data library 600 may be operable to carry out one or more of the features or functions described above without first receiving changes from an NE 1. For example, in one embodiment of the present invention, the meta-data library 600 may be operable to compare one or more of the models stored within subsections 601-604 to another of the stored versions. Further, the meta-data library 600 may be further operable to identify one or more differences based on one or more of these comparisons. In this manner, the meta-data library may compare one version of a model to a subsequent or preceding version or compare one type of model to another type of model in order to identify differences and similarities. Once these differences or similarities are identified, the meta-data library 600 may be further operable to generate one or more work orders, etc., where each work order is associated with one or more of the identified differences. The work orders may be used by a software engineer or network operator to generate logical instructions used to update one or more of compared versions in order to correct the differences or otherwise make changes to the versions.

In addition to version control (otherwise known as life cycle management), code generation and compatibility testing, meta-data libraries provided by the present invention also enable network operators or the like to determine the performance of a given combination of NEs, mediation units and OSSs. This includes, but is not limited to, throughput, resource utilization and other performance related metrics.

The determination of throughput provides the network operator with an idea of how efficiently (i.e., quickly) an NE may operate with his or her existing OSSs. This information is determined by assessing transformation models and test models. It is necessary for a network operator to know beforehand what kind of performance he or she could expect from a given OSS when a type of NE is added to his or her network.

It may be that a given OSS presently installed in a network is only capable of processing a certain volume of normalized meta-data, etc., over a given period of time. This volume of processing, whatever it may be, can be compared with the amount of processing required to process complex changes which originate from a given NE. Usually, the more complex the changes made to a model of an NE, the more complex the normalized meta-meta-data definitions an OSS must process. It may occur that a given OSS is not capable of processing such complex changes fast enough, and/or cost effectively.

Realizing this, the present invention provides for meta-data libraries that are capable of providing performance predictions.

In one embodiment of the present invention, the meta-data library 600 is further operable to assign a weighted value to one or more transformation models used in transforming received changes into their normalized forms. Each of the weighted values may represent a complexity scale where a higher weighted value may be associated with a more complex, transformation model and a lower weighted value may be associated with a less complex, transformation model. The assignment of these weighted values may be carried out by a comparison or means 605 in conjunction with a control section or means 606 or by other equivalent means. The assigned weighted values may then be stored within the meta-data library 600, for example, within subsection 614 of the test and development storage area 611. Thereafter, the meta-data library 600 may be further operable to compare one or more of these stored weighted values to one or more stored performance values, where each performance value is associated with one or more types or forms of an OSS. For example, an OSS may be assigned a performance value of 5 out of 10 indicating that it is capable of processing moderately complex changes generated by a moderately complex transformation model. This performance value can then be compared against the weighted values to determine how efficiently an OSS can process changes. For example, if a given transformation model is assigned a weighted value of 7 and a given OSS is assigned a performance value of 5, this would indicate that the given OSS is not capable of efficiently (or at all) processing more complex changes that may be sent to it by a mediation unit. On the other hand, if a given transformation model is assigned a weighted value of 3, this would indicate that the given OSS is capable of processing the less complex, transformed normalized model.

Based on this comparison, the meta-data library 600 is further operable to generate a performance prediction value. For example, meta-data library 600 may generate a "go" or "no go" performance prediction or a sliding scale where the meta-data library 600 may indicate that the use of a given complex transformation model may reduce the processing efficiency or capability of a given OSS by a certain percentage, for example.

In the example above, a greater weighted value is assigned to a more complex model and a lesser weighted value is assigned to a less complex model. It should be understood that these assignments are arbitrary and may be reversed in accordance with a specific meta-data library design.

The discussion above has attempted to set forth some examples of the features and functions of meta-data libraries provided by the present invention. However, it is the claims which follow which provide the metes and bounds of the scope of the present invention.

I claim:

1. A network meta-data library that is part of a telecommunications network hardware component operable to:
   receive at least changes associated with one or more telecommunication network models;
   compare the received changes to one or more stored telecommunication network models;
   identify portions of the compared one or more stored telecommunication network models affected by the received changes;
   generate a version of each stored model affected by the received changes; and
   forward a version of one or more models to a mediation unit to enable the generation of one or more normalized models.

2. The meta-data library as in claim 1 wherein the changes are associated with at least one network element.

3. The meta-data library as in claim 1 wherein the changes are associated with at least one operations support system.

4. The meta-data library as in claim 1 wherein the one or more stored models comprise previous versions of models selected from at least the group consisting of one or more network element models, one or more operations support models, one or more transformation models and one or more meta-meta data models.

5. The meta-data library as in claim 1 further operable to store the received changes and identified portions.

6. The meta-data library as in claim 5 operable to generate an audit trail for one or more network element models.

7. The meta-data library as in claim 5 operable to generate an audit trail for the one or more stored models.

8. The meta-data library as in claim 1 wherein the one or more, generated normalized models are recognizable to one or more operations support systems in response to the receipt of the changes.

9. A network meta-data library that is part of a telecommunications network hardware component operable to:
   receive at least one or more changes associated with one or more telecommunication models;
   link one or more portions of one or more stored telecommunication models to the received changes;
   generate one or more maps of the linked portions;
   generate one or more transformation models using one or more of the generated maps; and
   forward the one or more transformation models to a mediation unit to enable the generation of one or more normalized models.

10. The meta-data library as in claim 9 further operable to link the portions to the received changes on a meta-data-by-meta-data basis.

11. The meta-data library as in claim 9 further operable to link the portions on a portion-by-portion basis.

12. The meta-data library as in claim 9 wherein the received changes comprise changes from one or more network elements.

13. The meta-data library as in claim 9 wherein the models associated with the changes are selected from at least the group consisting of one or more network element models, one or more network management models, one or more transformation models and one or more meta-meta data models.

14. The meta-data library as in claim 9 wherein the one or more, generated normalized models are recognizable to one or more operations support systems in response to the receipt of the received changes.

15. A method for using a meta-data library to manage life-cycles of network models comprising:
   receiving at least changes associated with one or more telecommunication models;
   comparing the received changes to one or more stored telecommunication models;
   identifying portions of the compared one or more stored telecommunication models affected by the received changes;
   generating a version of each stored model affected by the received changes; and
   forwarding a version of one or more models to a mediation unit to enable the generation of one or more normalized models.

16. The method as in claim 15 wherein the changes are associated with at least one network element.

17. The method as in claim 15 wherein the changes are associated with at least one network management system.

18. The method as in claim 15 wherein the one or more stored models comprise previous versions of models selected from at least the group consisting of one or more network element models, one or more operations support models, one or more transformation models and one or more meta-meta data models.

19. The method as in claim 15 further comprising storing the received changes and identified portions.

20. The method as in claim 19 further comprising generating an audit trail for one or more network element models.

21. The method as in claim 19 further comprising generating an audit trail for the one or more stored models.

22. The method as in claim 15 wherein the one or more, generated normalized models are recognizable to one or more operations support systems in response to the receipt of the changes.

23. A method for mapping changes to network models in a meta-data library comprising:
   receiving at least one or more changes associated with one or more telecommunication models;
   linking one or more portions of one or more stored telecommunication models to the received changes;
   generating one or more maps of the linked portions;
   generating one or more transformation models using one or more of the generated maps; and
   forwarding the one or more transformation models to a mediation unit to enable the generation of one or more normalized models.

24. The method as in claim 23 further comprising linking the portions to the received changes on a meta-data-by-meta-data basis.

25. The method as in claim 23 further operable to link the portions on a portion-by-portion basis.

26. The method as in claim 23 wherein the received changes comprise changes from one or more network elements.

27. The method as in claim 23 wherein the models associated with the changes are selected from at least the group consisting of one or more network element models, one or more operations support models, one or more transformation models and one or more meta-meta data models.

28. The method as in claim 23 wherein the one or more, generated normalized models are recognizable to one or more operations support systems in response to the receipt of the received changes.

* * * * *